(12) United States Patent
Suzuki et al.

(10) Patent No.: US 9,007,338 B2
(45) Date of Patent: Apr. 14, 2015

(54) PRESSURE DETECTION UNIT AND INFORMATION INPUT DEVICE HAVING THE PRESSURE DETECTION UNIT

(75) Inventors: Takahiro Suzuki, Kyoto (JP); Yoshihiro Kai, Nagaokakyo (JP); Yuko Endo, Kyoto (JP); Seiko Hirai, Kameoka (JP)

(73) Assignee: Nissha Printing Co., Ltd., Kyoto (JP)

( * ) Notice: Subject to any disclaimer, the term of this patent is extended or adjusted under 35 U.S.C. 154(b) by 339 days.

(21) Appl. No.: 13/701,689

(22) PCT Filed: Apr. 13, 2011

(86) PCT No.: PCT/JP2011/059168
§ 371 (c)(1),
(2), (4) Date: Mar. 14, 2013

(87) PCT Pub. No.: WO2011/152127
PCT Pub. Date: Dec. 8, 2011

(65) Prior Publication Data
US 2013/0201150 A1 Aug. 8, 2013

(30) Foreign Application Priority Data
Jun. 3, 2010 (JP) ................................. 2010-128103

(51) Int. Cl.
G06F 3/045 (2006.01)
G06F 3/0354 (2013.01)
G06F 3/041 (2006.01)

(52) U.S. Cl.
CPC ............ *G06F 3/045* (2013.01); *G06F 3/03547* (2013.01); *G06F 3/0414* (2013.01)

(58) Field of Classification Search
CPC ........ H01L 41/08; H01L 41/04; H04N 5/222; G06F 3/045
See application file for complete search history.

(56) References Cited

U.S. PATENT DOCUMENTS 6,919,927 B1  7/2005  Hyodo
2007/0007850 A1 * 1/2007  Toit et al. ..................... 310/312

FOREIGN PATENT DOCUMENTS

| JP | 659795 A | 3/1994 |
|----|----|----|
| JP | 11355617 A | 12/1999 |
| JP | 2000222129 A | 8/2000 |
| JP | 2002182847 A | 6/2002 |
| JP | 2009176245 A | 8/2009 |

* cited by examiner

*Primary Examiner* — Michael Faragalla
(74) *Attorney, Agent, or Firm* — The Webb Law Firm (57) ABSTRACT

A pressure detection unit is disposed in a peripheral portion of a panel member of an information input device for detecting a press operation to the panel member. The pressure detection unit includes a first substrate, a second substrate disposed to face the first substrate, a pressure sensitive layer disposed between the first substrate and the second substrate, and a first electrode provided on the first substrate and a second electrode provided on the second substrate for detecting resistance change via the pressure sensitive layer, the first electrode and the second electrode being provided at positions not facing each other along normal lines of the first substrate and the second substrate. The first electrode, the second electrode and the pressure sensitive layer together form a series circuit in the form of a loop.

15 Claims, 11 Drawing Sheets

(PRIOR ART)

Fig.26

(PRIOR ART)

PRESSURE DETECTION UNIT AND INFORMATION INPUT DEVICE HAVING THE PRESSURE DETECTION UNIT

TECHNICAL FIELD

The present invention relates to a pressure detection unit for an information input device enabling input of information through detection of a press operation to a panel member and relates also to the information input device having the pressure detection unit.

BACKGROUND ART

Figure 25:
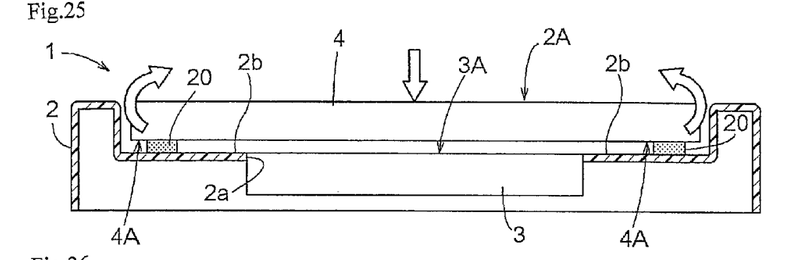
FIG. 25 is a section view showing an information input device relating to the prior art.

As an information input device including a panel member having an information input function, a device having a touch panel disposed on a liquid crystal display is being widely used. In the case of a digital camera having a liquid crystal monitor, there is known one configured such that on an upper face of the liquid crystal monitor there is disposed a panel member capable of detecting a contact position and a press force, so that in accordance with the strengths of the press at the time of contact, different instructions are given (see e.g. Patent Document 1, FIG. 25).

In a pressure detection unit 20 to be mounted on the information input device described above, for example, as shown in FIG. 26, between the first substrate 21 and the second substrate 22, from the side of the second substrate 22, there are arranged a second electrode 22A, a carbon layer 22B, a pressure sensitive ink layer 23a and a first electrode 21A in this mentioned order, so that the detection unit determines a pressure when the touch panel or the like is pressed down, and information is instructed for its input in accordance with a determined pressure value.

PRIOR ART DOCUMENT

Patent Document

Patent Document 1: Japanese Unexamined Patent Application Publication No. 11-355617

SUMMARY OF THE INVENTION

Figure 26:
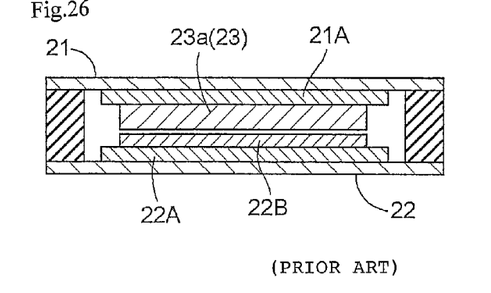
FIG. 26 is a section view showing a pressure detection unit relating to the prior art.

In the pressure detection unit shown in FIG. 26, on the second electrode 22A on the side of the second substrate 22, the carbon layer 22B is printed as being superposed thereon, a pressure sensitive ink layer 23a is coated on the carbon layer 22B, and the first electrode 21A is provided on the other side of the first substrate 21. In this case, as compared with the carbon layer 22B, the electrode portions 21A, 22B have more unevenness in their thicknesses and on their surfaces thereof. So, it sometimes happens that the surface of the carbon layer 22B contacting the pressure sensitive ink layer 23a is not smooth and flat. This results in instability in the condition of contact between the pressure sensitive ink layer 23a and the electrode layers 22A, 22B. As a result, this can also be a cause of irregularity in the sensitivity of the pressure detection unit.

The object of the present invention is to obtain a pressure detection unit having improved accuracy in sensitivity and an information input device having the pressure detection unit, so that the information input device may effect more reliable information input with a press operation.

According to a first characterizing feature of a pressure detection unit relating to the present invention, a pressure detection unit disposed in a peripheral portion of a panel member of an information input device for detecting a press operation to the panel member, the pressure detection unit comprising:

a first substrate;
a second substrate disposed to face the first substrate;
a pressure sensitive layer disposed between the first substrate and the second substrate; and
a first electrode provided on the first substrate and a second electrode provided on the second substrate for detecting resistance change via the pressure sensitive layer, respectively;
wherein the first electrode and the second electrode are provided at positions not facing each other along normal lines of the first substrate and the second substrate; and
the first electrode, the second electrode and the pressure sensitive layer together form a series circuit in the form of a loop.

In forming a pressure detection unit in an information input device, for instance, a pressure sensitive layer is formed on the first electrode, and this layer is formed by applying an amount of layer forming material. In this, since the electrode portion has a thickness and/or unevenness in its surface, the surface of the finished pressure sensitive layer is not always formed flat and smooth. Similarly, on the second electrode too, a pressure sensitive layer will be formed if necessary. In this case, when the pressure sensitive layers are pressed between and by the first substrate and the second substrate by applying a press force to the panel member, it may sometimes happen that the pressure sensitive layers or the pressure sensitive layer and the electrode come into contact with each other not through the flat surfaces, but convex portions thereof come into contact with each other. As a result, the electrical conduction state between the contacting components is not stable, so the pressure detection unit functions in an unstable manner.

In this regard, with the above arrangement, since the first electrode and the second electrode are provided at positions not facing each other as viewed along normal lines of the first substrate and the second substrate and the first electrode, the second electrode and the pressure sensitive layer together form a series circuit in the form of a loop, it is possible to disperse the influence applied to the pressure sensitive layer from the thickness and/or surface irregularity of the electrode portion. As a result, there can be obtained a pressure detection unit having improved contact state between the pressure sensitive layers and the electrodes. Further, even when the pressure detection unit is pressed, this does not result in direct pressing of the first electrode and second electrode against each other. Therefore, such inconvenience of mutual pressing between electrodes leading to damage thereof can be restricted and the durability of the pressure detection unit can be improved.

Moreover, since the first electrode, the second electrode and the pressure sensitive layer together form a series circuit in the form of a loop, as viewed along the normal lines of the first substrate and the second substrate, the first electrode of the first substrate and the second electrode of the second substrate together form a single row of electrodes. Therefore, the first electrode and the second electrode do not contact each other where the pressure sensitive layer is not disposed. Accordingly, there is no need to effect an insulating treatment to the first electrode and the second electrode.

According to a second characterizing feature of a pressure detection unit relating to the present invention, a pressure detection unit disposed in a peripheral portion of a panel member of an information input device for detecting a press operation to the panel member, the pressure detection unit comprising:

a first substrate;

a second substrate disposed to face the first substrate;

a pressure sensitive layer disposed between the first substrate and the second substrate; and a first electrode and a second electrode provided in one of the first substrate and the second substrate for detecting resistance change via the pressure sensitive layer, the first electrode and the second electrode being provided on the face of the one substrate which face faces the pressure sensitive layer;

wherein the first electrode, the second electrode and the pressure sensitive layer together form a series circuit in the form of a loop.

In the above arrangement, a first electrode and a second electrode are provided in one of the first substrate and the second substrate for detecting resistance change via the pressure sensitive layer and provided on the face of the one substrate which face faces the pressure sensitive layer; and the first electrode, the second electrode and the pressure sensitive layer together form a series circuit in the form of a loop. With this arrangement, it is possible to disperse the influence applied to the pressure sensitive layer from the thickness and/or surface irregularity of the electrode portion or the surface. As a result, it is possible to obtain a pressure detection unit having improved contact state between the pressure sensitive layer and the electrodes. Further, even when the pressure detection unit is pressed, this does not result in direct pressing of the first electrode and second electrode against each other. Therefore, such inconvenience of mutual pressing between electrodes leading to damage thereof can be restricted and the durability of the pressure detection unit can be improved.

Moreover, since the first electrode and the second electrode are provided on the face of one of the first and second substrates which face faces the pressure sensitive layer, in comparison with an arrangement wherein the electrodes are disposed on both the first substrate and the second substrate, the operation for disposing the electrodes on the substrate requires only one step. Hence, the manufacturing process for the pressure detection unit can be simplified.

According to a third characterizing feature of the pressure detection unit according to the present invention, the first electrode, the second electrode and the pressure sensitive layer are electrically connected to each other; and a position in the pressure sensitive layer not overlapped with at least one of the first electrode and the second electrode is configured to allow pressing.

With the above arrangement, the pressure sensitive layer is configured to allow pressing at a position thereof not overlapped with either one electrode. Therefore, the pressure sensitive area can be free from the influence of the thickness and/or surface irregularity of the electrode portion. Therefore, the possibility of the surface of at least one of the pressure sensitive layers in this area being smooth and flat becomes higher. As a result, the contact state between the pressure sensitive layer and the electrodes is improved and the pressure detection characteristics becomes stable, so that a pressure detection unit having even higher reliability can be obtained. Consequently, it has become possible for the information input device to achieve reliable information input with a press operation.

According to a fourth characterizing feature of the pressure detection unit according to the present invention, the first electrode, the second electrode and the pressure sensitive layer are electrically connected to each other; and a position in the pressure sensitive layer overlapped with neither the first electrode nor the second electrode is configured to allow pressing.

With the above arrangement, the pressure sensitive layer is configured to allow pressing at a position thereof overlapped with neither electrodes. Therefore, it becomes possible to provide the component surfaces of both the first electrode and the second electrode with greater flatness and smoothness. Hence, it becomes possible to obtain a more reliable pressure detection unit with improved contact of the pressure sensitive layer at the pressure sensitive area.

According to a fifth characterizing feature of the pressure detection unit relating to the present invention, at least one of the first electrode and the second electrode is coated with an electrically conductive layer.

In case the electrode of the pressure detection unit is coated directly with the pressure sensitive layer, depending on the characteristics of the material used in the electrode, the electrode may be damaged by the compressed pressure sensitive layer. With the above arrangement, however, since the electrode is protected as being coated with an electrically conductive layer, the electrode can be less vulnerable to damage or the like. As a result, the durability of the pressure detection unit is improved.

According to a sixth characterizing feature of the pressure detection unit relating to the present invention, the pressure detection unit further comprises: a first electrically conductive layer coating the first electrode and a second electrically conductive layer coating the second electrode; wherein the first electrically conductive layer includes a first extension portion extending laterally relative to the first electrode, the second electrically conductive layer includes a second extension portion extending laterally relative to the second electrode; the pressure sensitive layers coat at least one of the first extension portion and the second extension portion; and when the pressure detection unit is pressed, the pressure sensitive layers are compressed only by the first electrically conductive layer relating to the first extension portion and the second electrically conductive layer relating to the second extension portion.

With the above arrangement, in forming the first electrically conductive layer and the second electrically conductive layer, electrically conductive layers having extremely smooth and flat surfaces can be formed in the region where the first electrode and the second electrode which per se are projections are not existent. Also, when the pressure sensitive layer is formed on the surface of one of these electrically conductive layers, since the electrically conductive layer as the base therefor is smooth and flat, a pressure sensitive layer having substantially same smoothness as the electrically conductive layer can be obtained. Therefore, with the arrangement of the pressure sensitive layers being compressed only in the regions of the first extension portion and the second extension portion, the contact may be rendered appropriate over a larger area, so that a pressure detection unit having stable detection characteristics can be obtained.

According to a seventh characterizing feature of the pressure detection unit relating to the present invention, the first electrically conductive layer and the second electrically conductive layer are comprised of carbon layers containing carbon particles mixed with binder.

Normally, carbon particles are available in variety of particle sizes. Then, by mixing such carbon particles in the binder and applying the resultant mixture, it is possible to obtain smooth electrically conductive layer having fine surface characteristics. Therefore, since it becomes possible to obtain a large contact area in compressing the pressure sensitive layer, it is possible to obtain a pressure detection unit having superior electrical conductivity characteristics.

According to an eighth characterizing feature of the pressure detection unit relating to the present invention, the pressure detection unit further comprises a load transmission member provided on the outer face of at least one of the first substrate and the second substrate for applying a concentrated load to the pressure sensitive layer.

With the above arrangement, when a load is applied from the outside to the pressure detection unit, as the load transmission member supports the pressure detection unit, the external load can be received in a concentrated manner without dissipation thereof and this load can be transmitted reliably to the pressure sensitive layer. As the pressure sensitive layers are pressed reliably as described above, the detection accuracy of the pressure detection unit can be improved.

According to a characterizing feature of an information input device relating to the present invention, the information input device comprises: a panel member capable of receiving input instruction by a press operation; a support portion provided in a device body for supporting the peripheral portion of the panel member; and the pressure detection unit according to any one of the first through eighth features provided between the panel member and the support portion.

With the above arrangement, with the pressure detection unit having improved detection characteristics, information input by a press operation to a panel member in the information input device can be effected in a stable manner. Further, since the pressure detection unit is configured such that the first electrode, the second electrode and the pressure sensitive layer together form a series circuit in the form of a loop, it is possible also to decrease the area of the pressure detection unit to be disposed in the peripheral edge of the panel member and to increase the press operation area of the panel member.

MODES OF EMBODYING THE INVENTION

Next, embodiments of an information input device 1 relating to the present invention will be described with reference to the accompanying drawings.

Embodiment 1

Figure 1:
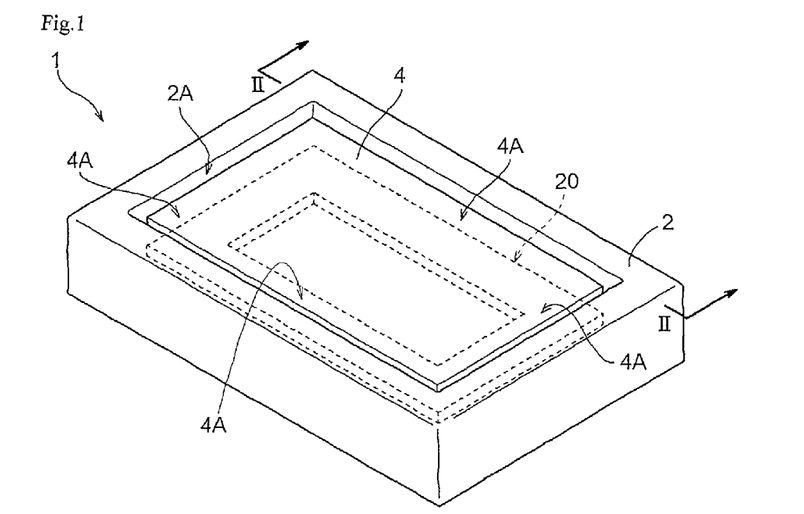
FIG. 1 is a perspective view of an information input device including a pressure detection unit relating to the present invention.
Figure 2:
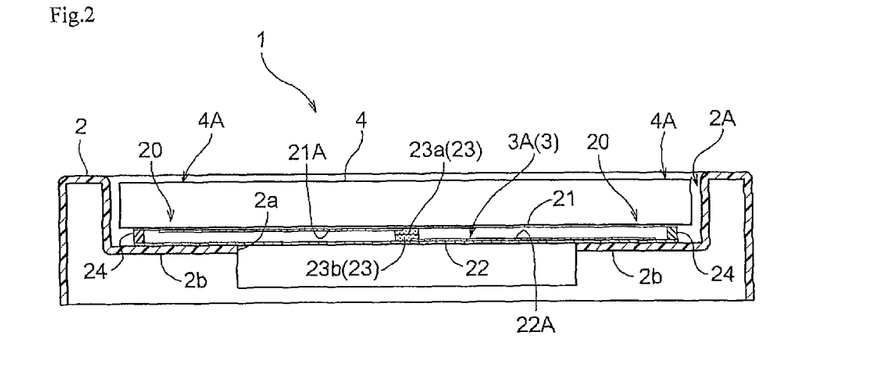
FIG. 2 is a section along II-II in FIG. 1.

As shown in FIG. 1 and FIG. 2, an information input device 1 includes a housing body 2 forming an opening 2A or the like in its front face which mounts therein a display device 3 having a display portion 3A formed of liquid crystal, organic EL, etc. and mounts also a panel member 4 having a touch type information input function.

In the present invention, the opening 2A of the housing body 2, as shown in FIG. 2, is formed by cutting out the upper face of the housing body 2 so as to form a step for allowing fitting-in of the panel member 4. And, on the bottom face thereof, there are provided a display device opening 2a for exposing the display portion 3A of the display device 3 mounted inside the housing body 2 to the outside, and a frame-like support portion 2b for supporting a peripheral portion 4A of the panel member 4.

The shape and size of the opening 2A can vary in many ways, in accordance with the shape and size of the panel member 4. Further, the mounting depth of the opening 2A too can vary in many ways in accordance with e.g. the thickness of the panel member 4. Moreover, the shape and size of the display device opening 2a of the opening 2A can vary in many ways, in accordance with the shape and size or the like of the display portion 3A. In this embodiment, the opening 2A, the display device opening 2a, the display portion 3A and the panel member 4 each have a rectangular or approximately rectangular shape. However, the shapes of the panel member 4, etc. are not particularly limited, but can be circular, for example. The mounting depth of the opening 2A can be set so that the surface of the housing body 2 may be in substantially same level as the surface of the panel member 4.

Figure 4:
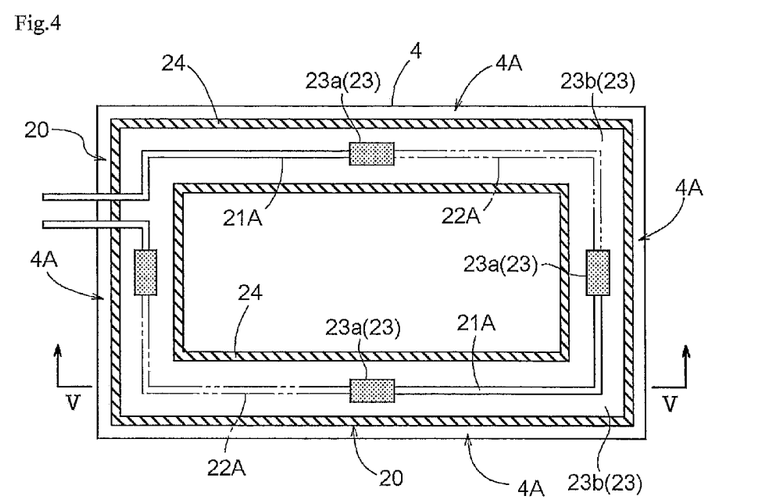
FIG. 4 is a view showing layout of the pressure detection unit in the information input device.

The information input device 1 includes a pressure detection unit 20 (or "a pressure detection portion") capable of detecting a press operation to the panel member 4. The pressure detection unit 20 is disposed between the panel member 4 and the support portion 2b of the housing body 2 and includes e.g. an unillustrated signal processing circuit for processing output signals. The configuration of the pressure detection unit 20 is not particularly limited as long as it is capable of detecting a pressing pressure. As shown in FIG. 1 and FIG. 4, as the pressure detection unit 20, at least one thereof is provided in the peripheral portion 4A of the panel member 4. The panel member 4 may have the so-called touch input function for detecting X-Y coordinates of an operational position, based on a touch operation to the panel member 4. Of the member having the touch input function, it can be selected from the resistive film type, the electrostatic capacitance type, electromagnetic induction type, etc.

Figure 3:
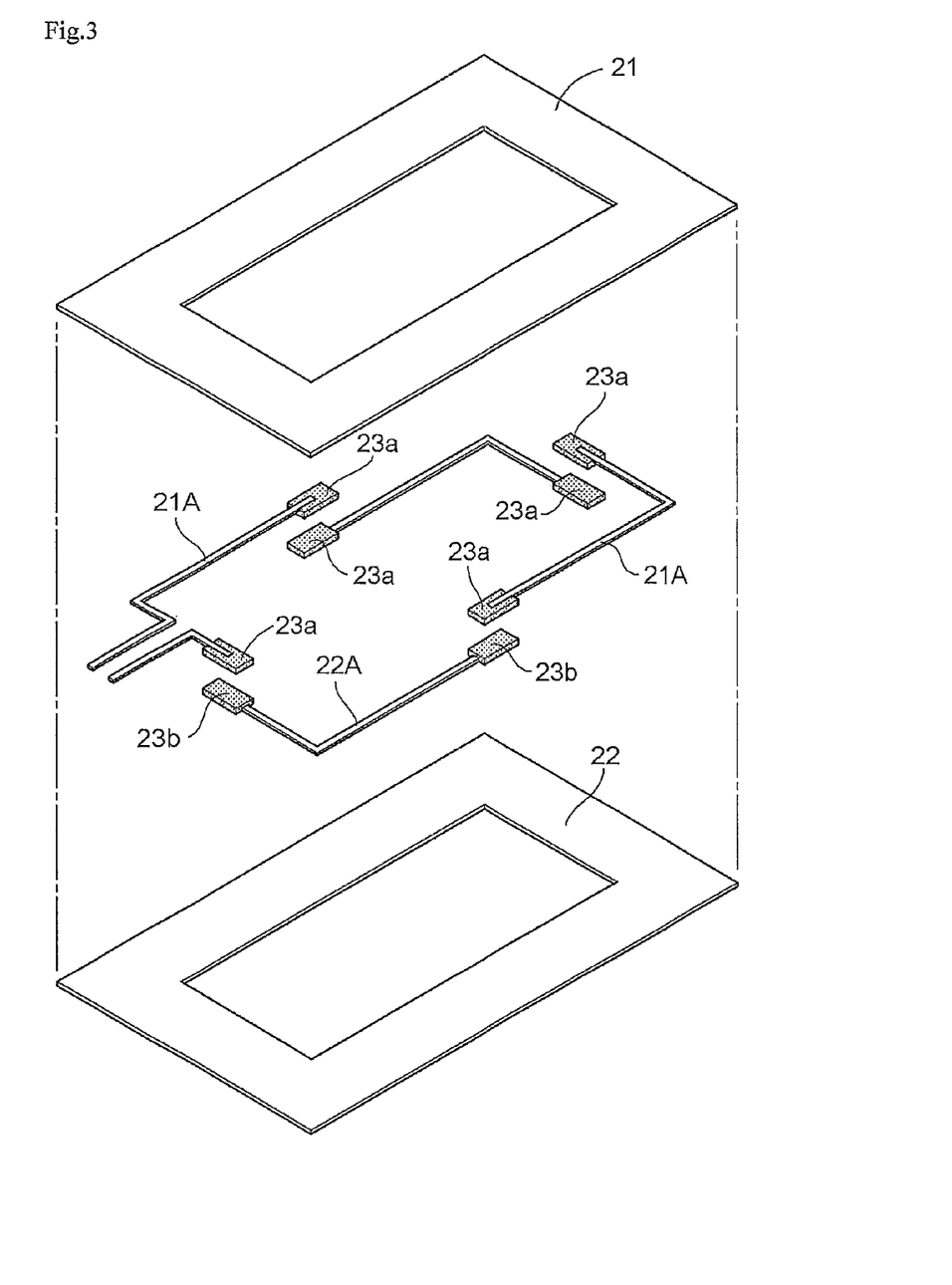
FIG. 3 is an exploded view of the pressure detection unit.

As shown in FIG. 3, under the panel member 4, in the order from the upper side, there are disposed a frame-like first substrates 21, first electrodes 21A extending from a pair of opposed corner portions opposed to each other on a diagonal line to the adjacent sides, upper pressure sensitive ink layers 23a, lower pressure sensitive ink layers 23b, second electrodes 22A extending from the other pair of opposed corner portions opposed to each other on a diagonal line to the adjacent sides, and a second substrate 22. On the lower face of the frame-like first substrate 21, the first electrodes 21A are arranged in the form of L-shape forming intersection points thereof at the two corners on the diagonal line, and on the upper face of the second substrate 22, the second electrodes 22A are arranged in the form of L-shape forming intersection points thereof at the other two corners on the diagonal line. In this way, the first electrode 21A, the second electrode 22A, the upper pressure sensitive ink layers 23a and the lower pressure sensitive ink layers 23b together form a loop-like series circuit.

More particularly, the first electrode 21A and the second electrode 22A are disposed at positions not facing each other as viewed along the normal lines of the first substrate 21 and the second substrate 22. Hence, when the first electrode 21A is pressed against the pressure sensitive layer 23, the second electrode 22A does not hinder the pressing of the first electrode 21A. Further, conversely, when the second electrode 22A is pressed against the pressure sensitive layer 23, the first electrode 21A does not hinder the pressing of the second electrode 22A. As a result, there can be obtained a pressure detection unit 20 having improved contact conditions between the pressure sensitive layers 23 and the first and second electrodes 21A, 22A. Further, when the pressure detection unit 20 is pressed, there occurs no direct mutual pressing between the first electrode 21A and the second electrode 22A. Therefore, it is possible to restrict occurrence of frictional wear of the electrodes which could occur with repeated mutual pressing between the electrodes, so that the durability of the pressure detection unit 20 is improved.

The inner sizes of the frame-like first substrate 21 and second substrate 22 are matched with the size of the opening 2A, and the outer sizes thereof are matched with an X-Y coordinates detection device (not shown) provided separately. As described above, the first electrode 21A disposed on the face of the first substrate 21 facing the second substrate 22 and the second electrode 22A disposed on the face of the second substrate 22 facing the first substrate 21, form a loop-like series circuit as viewed along the normal lines of the first substrate 21 and the second substrate 22. That is, as the first electrode 21A and the second electrode 22A are not in contact with each other even at the portion where the pressure sensitive layers 23 are not disposed, there is no need for insulating treatment of the first electrode 21A and the second electrode 22A.

The pressure detection unit 20 is attached to the opening 2A as the second substrate 22 is bonded on the support portion 2b by means of e.g. an adhesive agent (not shown).

In the area where the first substrate 21 and the second substrate 22 face each other and on the opposite sides of the pressure sensitive layer 23, there is provided a connecting portion 24. This connecting portion 24 may comprise e.g. an adhesive bonding agent or a double-face bonding material having elasticity and is formed in a thickness substantially equal to or greater than the combined thickness of the second electrode 22A, the second electrically conductive layer 22B, the pressure sensitive ink layers 23 and the first electrically conductive layer 21B. In the illustration of FIG. 2, the electrodes, the electrically conductive layer and the pressure sensitive ink layers are spaced apart from the connecting portion 24. However, the electrodes, the electrically conductive layer and the pressure sensitive ink layers may be partially in contact with the connecting portion 24.

Next, operations of the pressure detection unit 20 mounted in the information input device 1 will be described. Inside the information input device 1, the first electrode 21A and the second electrode 22A are connected to a connector (not shown) and this connector is connected to a load detection unit (not shown) incorporated in the information input device 1.

The pressure detection unit 20 detects change in resistance between the first electrode 21A and the second electrode 22A via the upper pressure sensitive ink layer 23a and the lower pressure sensitive ink layer 23b which occurs in the pressure sensitive layers 23 at the time of a press operation to the panel member 4. Through detection of this resistance change, the external force applied to the pressure sensitive layer 23 can be detected and the load to the panel member 4 can be detected.

The first substrate 21 and the second substrate 22 can be e.g. films or the like and material forming the same can be one usable for flexible substrates, e.g. general-purpose engineering resin such as polyethylene terephthalate, polystyrene resin, polyolefin resin, ABS resin, AS resin, acrylic resin, AN resin, general-engineering resin such as polystyrene resin, polycarbonate resin, polyacetal resin, polycarbonate modified polyphenylene ether resin, polybutylene terephthalate resin, ultrahigh molecular weight polyethylene resin, or a super-engineering resin such as polysulfone resin, polyphenylene sulfide resin, polyphenylene oxide resin, polyarylate resin, polyetherimide resin, polyimide resin, liquid crystal polyester resin, polyallyl heat resistant resin, etc.

As the material for forming the first electrode 21A and the second electrode 22A of the pressure detection unit 20, it is possible to employ a metal such as gold, silver, copper, nickel, etc. or a paste having electrical conductivity containing carbon or a plurality of species of material above. As the method for forming these, a printing method such as screen printing, offset printing, gravure printing, or flexo printing or a photoresist method can be cited. Further, the first electrode 21A and the second electrode 22A can be formed by affixing a metal foil of copper, gold, or the like. Further alternatively, the first electrode 21A and the second electrode 22A can be formed also by forming electrode patterns with using a resist on an FPC plated with a metal such as copper and then effecting an etching treatment on the portion of the metal foil not protected with the resist. The electrodes can be formed and laminated with any desired combination of the forming methods and materials mentioned above.

The composition constituting the upper pressure sensitive ink layer 23a and the lower pressure sensitive ink layer 23b of the pressure detection unit 20 comprises a material whose electrical characteristics such as the electrical resistance value varies in response to an external force. As this composition, e.g. a quantum tunnel phenomenon material (commercial name "QTC") available from Peratech Limited in U.K. can be employed. The upper pressure sensitive ink layer 23a and the lower pressure sensitive ink layer 23b can be provided on the first substrate 21 and the second substrate 22 by means of applying thereof. As the method for applying the upper pressure sensitive ink layer 23a and the lower pressure sensitive ink layer 23b, a printing method such as screen printing, offset printing, gravure printing, or flexo printing can be employed.

At least one pressure detection unit 20 is provided, and the unit 20 is respectively bonded to the lower face of the panel member 4 of the information input device 1 by means of an adhesive agent such as paste, or an adhesive layer such as a double-sided bonding tape. And, the pressure detection unit 20 is provided so as to be covered up by the ornamental portion in the peripheral portion 4A of the panel member 4. Therefore, the respective components constituting the pressure detection unit 20 need not be formed of a transparent material, but may be formed of a colored material.

Figure 5:
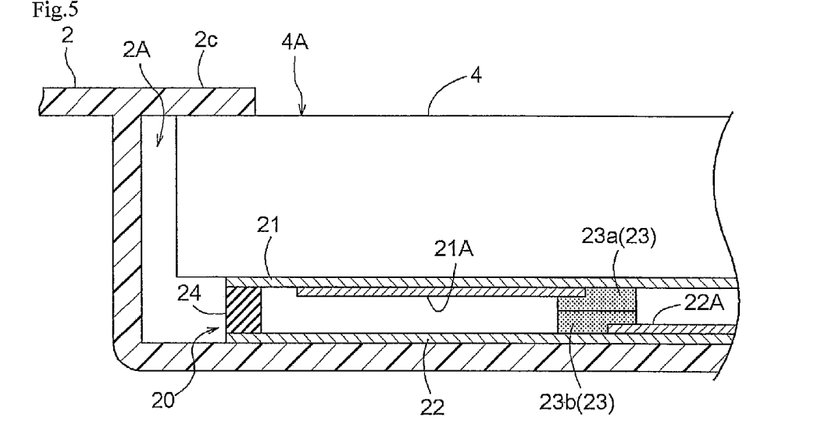
FIG. 5 is a section showing a different configuration of an information input device.

Incidentally, the housing body 2 of the information input device 1, as shown in FIG. 5, may be of a shape having a bezel 2c upwardly of the panel member 4. If such bezel 2c is provided in the housing body 2, the peripheral portion 4A of the panel member 4 and the pressure detection unit 20 disposed in this peripheral portion 4A can be clamped and fixed by the support portion 2b and the bezel 2c of the housing body 2.

Embodiment 2

Figure 6:
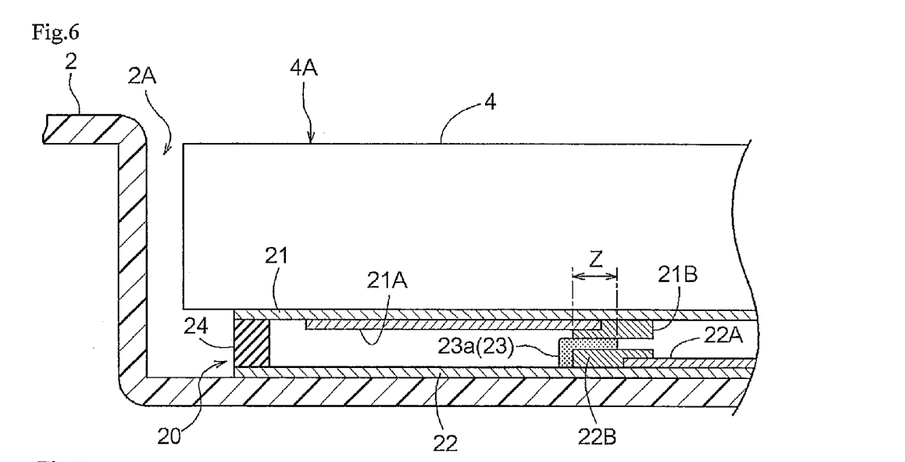
FIG. 6 is an enlarged section showing the vicinity of a pressure detection unit according to Embodiment 2.

In this embodiment, as shown in FIG. 6, the first electrode 21A disposed on the first substrate 21 is coated or covered with a first electrically conductive layer 21B. On the other hand, the second electrode 22A disposed on the second substrate 22 is coated or covered with a second electrically conductive layer 22B. Further, the second electrically conductive layer 22B is coated with the pressure sensitive ink layer 23a as the pressure sensitive layer 23.

The surface of the pressure sensitive ink layer 23a coating the second electrically conductive layer 22B faces the first electrically conductive layer 21B. Therefore, when the pressure detection unit 20 is pressed by the panel member 4, there is formed, between the second electrode 22 and the second electrically conductive layer 22B, an area (pressure sensitive area) Z where the pressure sensitive layers 23 are compressed. Here, the second electrode 22A is disposed at a position outside the pressure sensitive area Z (that is, a position not overlapped with the pressure sensitive area Z). Namely, a portion of the pressure sensitive layer 23 not overlapped with the second electrode 22A can be pressed; and only the second electrically conductive layer 22B is present on the second substrate 22 side of the pressure sensitive area Z, so that the possibility of the surface of this second electrically conductive layer 22B being flat and smooth may be higher. As a result, when the pressure detection unit 20 is pressed, the contact state between the second electrically conductive layer 22B and the pressure sensitive ink layer 23a in the pressure sensitive area Z is improved, so that the pressure detection characteristics may be stable.

As the material for forming the first electrically conductive layer 21B and the second electrically conductive layer 22B, a substantially same or similar material as/to the material forming the first electrode 21A and the second electrode 22B may be employed. In the case of employing the electrically conductive paste, it is preferred that the paste have particle size smaller than that of the material forming the first electrode 21A and the second electrode 22A. With use of such material having smaller particle size for forming the electrically conductive layers, flat and smooth electrically conductive layers can be readily formed. Of the above-cited kinds of material, as the carbon particles, materials having various particle sizes are available. Therefore, by mixing carbon particles of smaller size in the binder and applying the resultant mixture, it is possible to obtain smooth and flat electrically conductive layers having fine surface characteristics.

Embodiment 3

Figure 7:
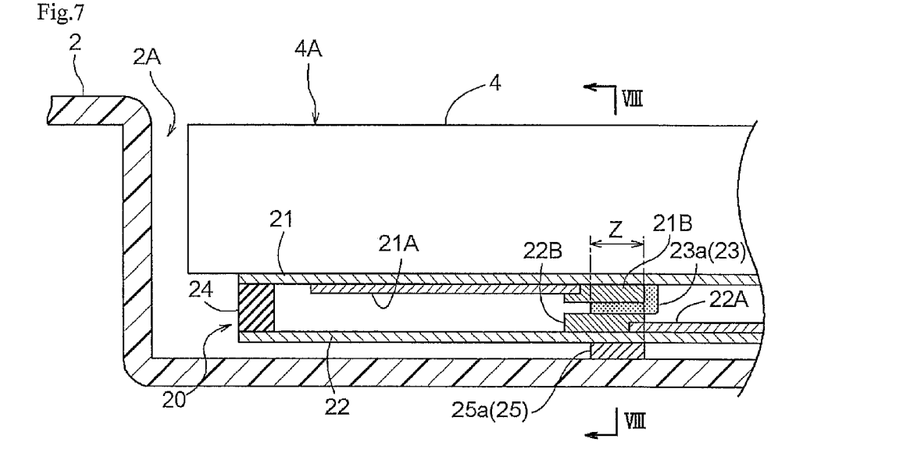
FIG. 7 is an enlarged section showing the vicinity of a pressure detection unit according to Embodiment 3.
Figure 8:
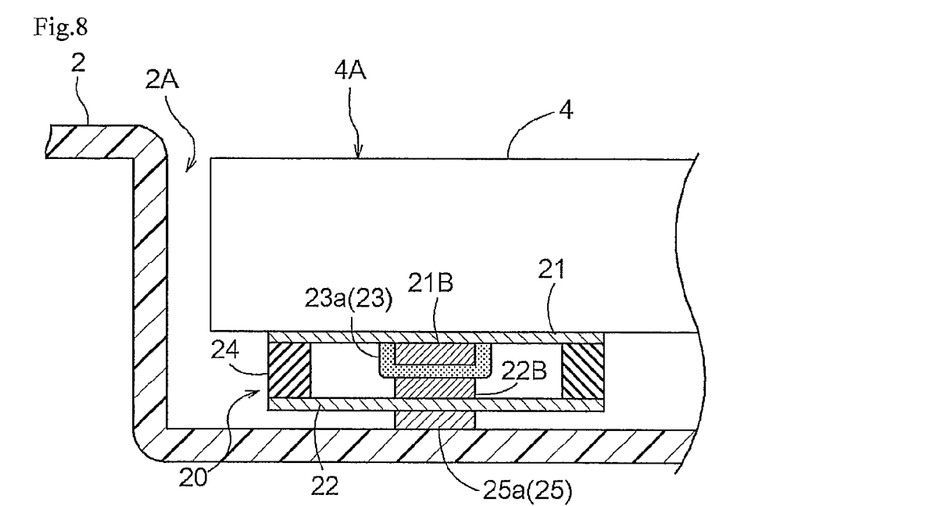
FIG. 8 is a section along VIII-VIII in FIG. 7.
Figure 9:
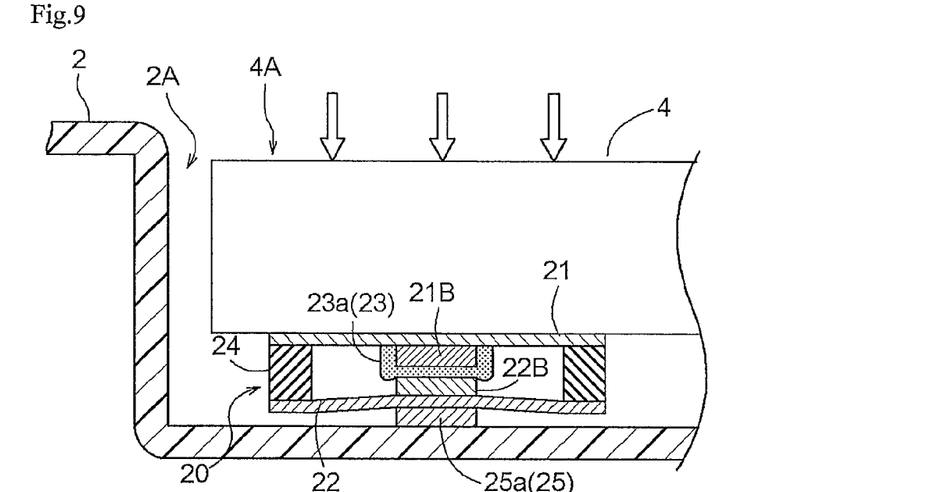
FIG. 9 is an enlarged section showing operational condition of the pressure detection unit according to Embodiment 3.

In the instant embodiment, as shown in FIG. 7 and FIG. 8, the pressure detection unit 20 is configured such that the first electrically conductive layer 21B is coated or covered with a pressure sensitive layer 23. The pressure sensitive area Z of the pressure sensitive layer 23 is located between the first electrically conductive layer 21B and the second electrically conductive layer 22B and the first electrode 21A is provided at a position not overlapped with the pressure sensitive area Z in the direction along the first substrate 21. In the pressure detection unit 20, on the outer face of the second substrate 22, there is provided a bump 25a which contacts with the support portion 2b as a load transmission member 25 for applying a concentrated load to the pressure sensitive layer 23. The bump 25a is disposed to be overlapped with the pressure sensitive area Z, such that when a load is applied to the pressure detection unit 20 from the panel member 4, the bump 25a supports the pressure detection unit 20 from the lower side thereof, thereby to transmit this load in a concentrated manner to the pressure sensitive layer 23 (cf. FIG. 9).

As some examples of possible configuration of the bump 25a, this can be formed by printing or applying an amount of thermosetting resin or UV setting resin and allowing it to be set, cutting a film or resin plate to a size matching the pressure detection unit and then affixing thereto, a foam member such as PE foam, urethane foam etc., or adhesive bonding agent or double-sided bonding member, a double-side bonding tape, etc.

Incidentally, in case the pressure sensitive layer 23 is provided in the second electrically conductive layer 22B, the bump 25a will be provided on the back side of the first substrate 21 to contact the panel member 4. In this, the height size of the bump 25a will range from 50 μm to 200 μm for example (including the thickness of the bonding layer for bonding to the second substrate 22).

Instead of forming the bump 25a, a convex portion may be formed at the portion of the housing body 2 corresponding to the pressure sensitive area Z. With provision of such convex portion in the housing body 2 per se, this convex portion functions as the load transmission member 25.

Embodiment 4

Figure 10:
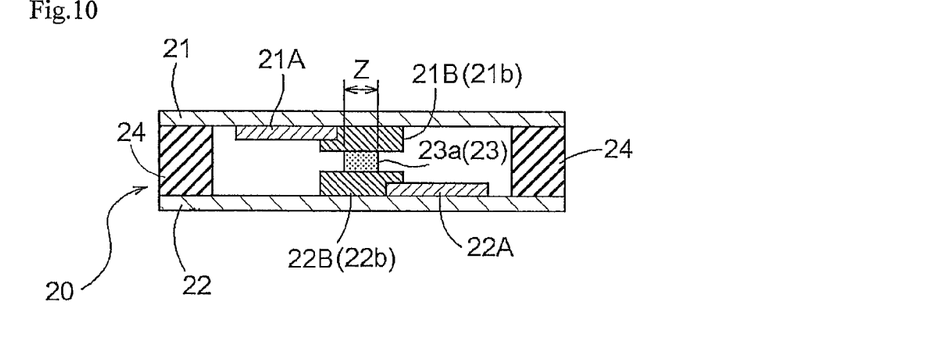
FIG. 10 is an enlarged section showing the vicinity of a pressure detection unit according to Embodiment 4.

In this embodiment, as shown in FIG. 10, the pressure detection unit 20 is configured such that the first electrically conductive layer 21B coating the first electrode 21A includes a first extension portion 21b extending toward the counter-center side and the second electrically conductive layer 22B includes a second extension portion 22b extending toward the center side. In the above, the first electrically conductive layer 21B and the second electrically conductive layer 22B are disposed vertically approximately parallel with each other and a portion of the second extension portion 22b is coated with the pressure sensitive layer 23, and the pressure sensitive layer 23 is provided between the first extension portion 21b and the second extension portion 22b to form the pressure sensitive area Z therein. Hence, the pressure detection unit 20 is configured such that the pressure sensitive area Z which is the position of the pressure sensitive layers 23 overlapped with neither the first electrode 21A nor the second electrode 22A can be pressed.

In this way, if the first electrode 21A and the second electrode 22A are present at positions not overlapped with the pressure sensitive area Z, it becomes possible to provide the component surfaces of the first electrically conductive layer 21B and the second electrically conductive layer 22B with even greater flatness and smoothness. Hence, it is possible to obtain a pressure detection unit 20 having even higher reliability with the even more reliable contact between the pressure sensitive layers 23 and the first and second electrically conductive layers 21B, 22B.

In particular, the pressure sensitive layer 23 coats only the second extension portion 22b of the second electrically conductive layer 22B. Therefore, even when the pressure sensitive layer 23 is compressed, the second electrode 22b is not pressed directly. Hence, the second electrode 22A is less likely to be damaged by an excessive pressing operation to the panel member, so that the durability of the pressure detection unit 20 is improved.

Figure 11:
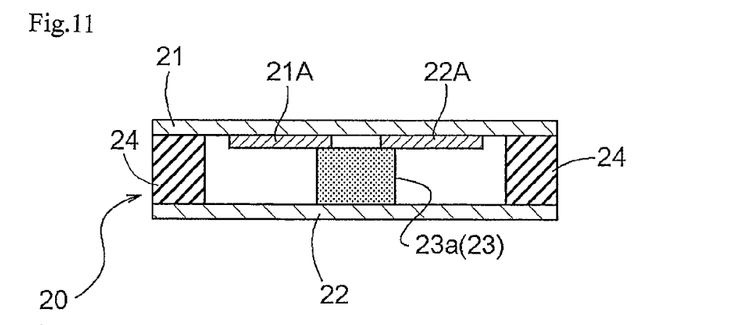
FIG. 11 is an enlarged section showing the vicinity of a pressure detection unit according to a further embodiment.
Figure 12:
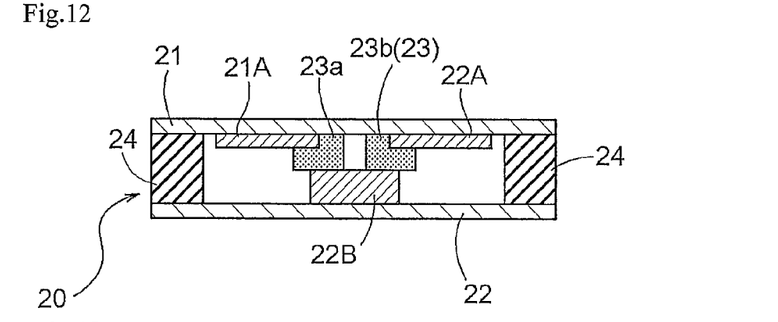
FIG. 12 is an enlarged section showing the vicinity of a pressure detection unit according to a further embodiment.

Other Embodiments (1) In the foregoing embodiment, the first electrode 21A is disposed on the first substrate 21 and the second electrode 22A is disposed on the second substrate 22. Instead, the pressure detection unit 20 can be configured such that the first electrode 21A and the second electrode 22A are disposed on the face of one substrate of the first substrate 21 and the second substrate 22 which face faces the pressure sensitive layer 23. In this case, for example, as shown in FIG. 11, the first electrode 21A and the second electrode 22A will be disposed on the first substrate 21 and the pressure sensitive layer 23 will be disposed on the second substrate 22. Further alternatively, as shown in FIG. 12, the first electrode 21A and the second electrode 22B will be disposed on the first substrate 21, the first electrode 21A will be coated with the upper pressure sensitive ink layer 23a and the second electrode 21A will be coated with the lower pressure sensitive ink layer 23b, and on the second substrate 22, an electrically conductive layer 22B will be disposed if or when necessary. Further, the first electrode 21A and the second electrode 22A may respectively be coated with an electrically conductive layer.

If the first electrode 21A and the second electrode 22B are disposed on one of the first substrate 21 and the second substrate 22, in comparison with the case of disposing the electrodes on the first substrate 21 and the second substrate 22 respectively, the operation of disposing the electrodes on the substrate can be completed with one time operation. Hence, the manufacturing process of the pressure detection unit 20 can be simplified.

Figure 13:
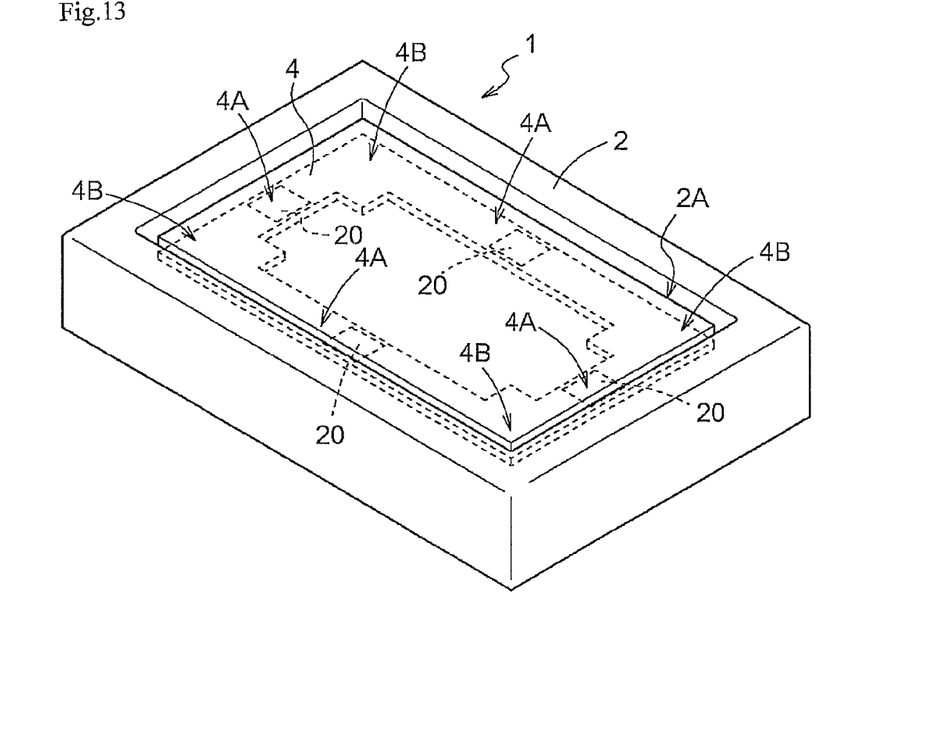
FIG. 13 is a perspective view showing an information input device according to a further embodiment.

(2) In the information input device 1, when the panel member 4 whose peripheral portion 4A is fixed is pressed, the peripheral portion 4A tends to float due to flexure of the panel member 4. This floating action can cause reduction in the accuracy of the pressure detection unit 20 disposed in the peripheral portion 4A. Then, the information input device 1 shown in FIG. 13 includes a floating prevention mechanism for preventing floating of a corner portion 4B of the panel member 4 off the housing body 2. The pressure detection units 20 are provided respectively on the long side of the peripheral portion 4A of the rectangular panel member 4 excluding the corner portion 4B and are provided respectively on the short side thereof. However, the disposing layout and the disposing number of the pressure detection units 20 are not limited to the above. For instance, the pressure detection unit 20 may be provided in the corner portion 4B. Incidentally, the term "corner portion 4B" refers to a predetermined area from the corner of the panel member 4. For example, this can be the area of ¼ distance of the straight distance between the center of the panel member 4 and the pressure detection unit 20 disposed closest to this center.

Figure 14:
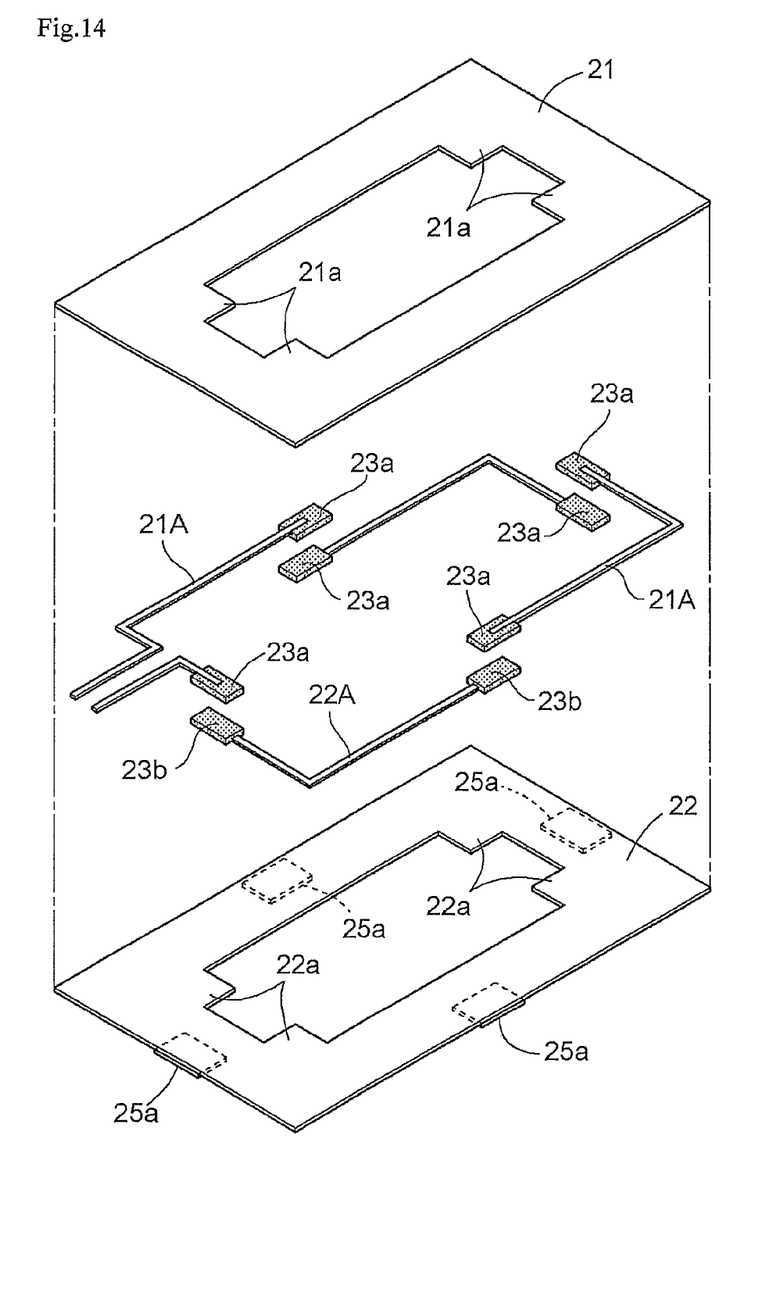
FIG. 14 is an exploded perspective view showing a pressure detection unit according to a further embodiment.

As shown in FIG. 14, downwardly of the panel member 4, in the order from the top side thereof, there are disposed the first substrate 21, the first electrode 21A, the upper pressure sensitive ink layer 23a, the lower pressure sensitive ink layer 23b, the second electrode 22A, the second substrate 22 and the bump 25a. On the lower face of the frame-like first substrate 21, there is disposed the first electrode 21A in the form of a frame and on the upper face of the frame-like second substrate 22, there is disposed the second electrode 22A in the form of a frame.

Figure 15:
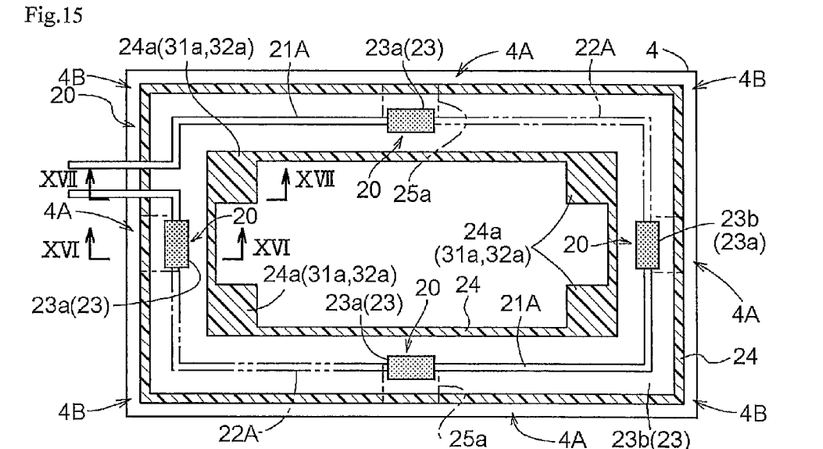
FIG. 15 is a plane view showing layout of a floating prevention mechanism according to a further embodiment.

FIG. 15 is a plane view showing the arrangement of the floating prevention mechanism. In the instant embodiment, from the four corners inside the frames of the first substrate 21 and the second substrate 22, there are respectively provided projections 21a, 22a projecting toward the inner sides (see FIG. 14). The floating prevention mechanism in this embodiment is constituted by providing the projection 21a of the first substrate 21 and the projection 22a of the second substrate 22 with a wide bonding member 24a, a wide upper bonding portion 31a and a wide lower bending portion 32a.

Figure 16:
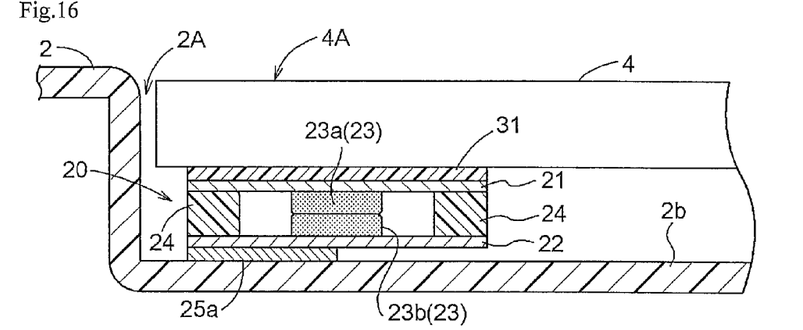
FIG. 16 is a section view along XVI-XVI in FIG. 15.

FIG. 16 is a section along XVI-XVI in FIG. 15, that is, a section of the peripheral portion 4A where the pressure detection unit 20 is formed. In the pressure detection unit 20, the lower face of the panel member 4 and the upper face of the first substrate 21 are bonded to each other via an upper bonding portion 31 and the upper face of the support portion 2b of the housing body 2 and the lower face of the second substrate 22 are bonded via a bump 25a comprising a double-sided adhesive tape. As the upper bonding portion 31 and the lower bonding portion 32 to be described later, adhesive agent such as paste, a double-sided adhesive tape, etc. can be employed.

Figure 17:
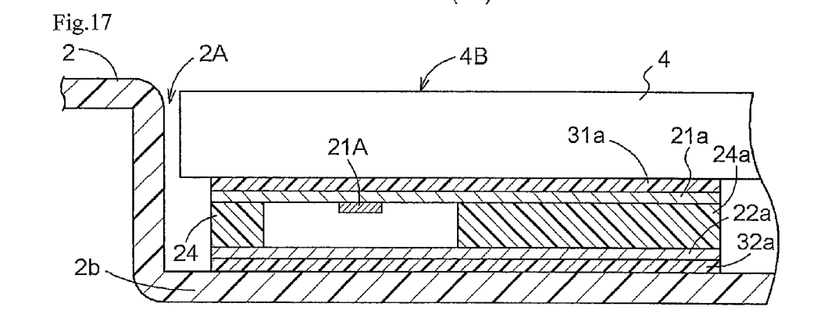
FIG. 17 is a section view along XVII-XVII in FIG. 15.

FIG. 17 is a section along XVII-XVII in FIG. 15, that is, a section of the corner portion 4B where the pressure detection unit 20 is not formed. In the corner portion 4B, there are provided projections 21a, 22a projecting from the inner frame of the first substrate 21 and the second substrate 22 toward the inner side. With provision of such projections 21a, 22a, a wide bonding member 24a, a wide upper bonding portion 31a and a wide lower bonding portion 32a can be provided, so that the bonding area in the corner portion 4B can be larger. As a result, the bonding force in the corner portion 4B is increased and it becomes possible to prevent the floating of the panel member 4.

In the corner portion 4B, the pressure sensitive ink layers 23a, 23b are not provided, so that this portion does not function as the pressure detection unit 20. Therefore, even if the corner portion 4B of the panel member 4 should float, as no pressure is detected in this corner portion 4B, the detection accuracy of the pressure detection unit 20 can be improved.

Figure 18:
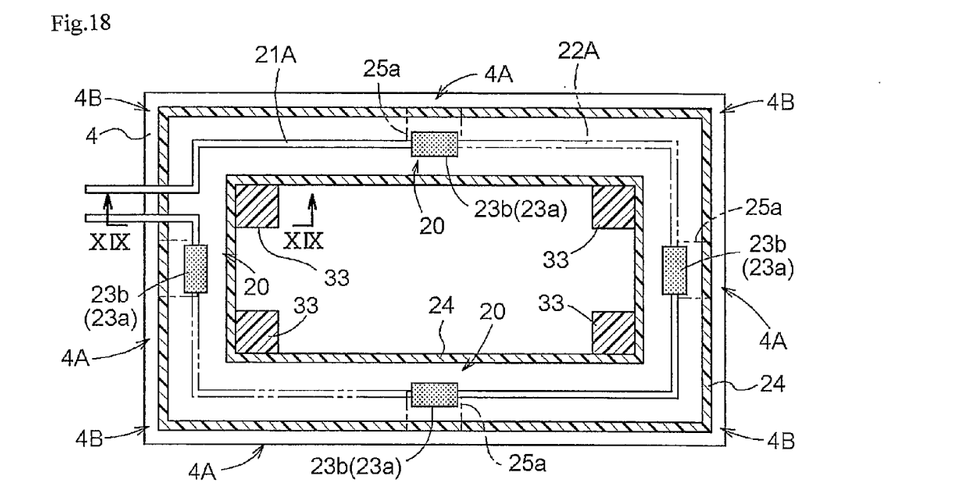
FIG. 18 is a plane view showing layout of a floating prevention mechanism according to a further embodiment.
Figure 19:
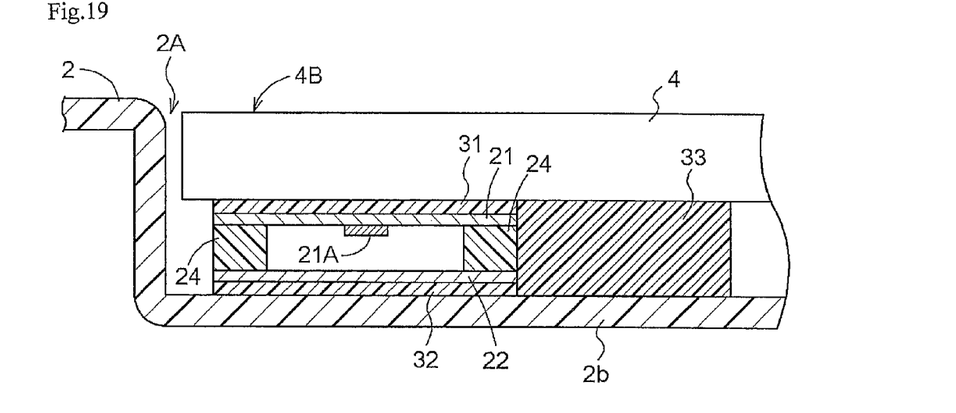
FIG. 19 is a section along XIX-XIX in FIG. 18.

No projections may be provided in the first substrate 21 and the second substrate 22. In this case, as shown in FIG. 18 and FIG. 19, in the corner portion 4B of the panel member 4, in the area on the inner sides of the inner frames of the first substrate 21 and the second substrate 22, bonding portions 33 for directly bonding between the panel member 4 and the support portion 2b of the housing body 2 may be provided as the floating prevention mechanism.

With provision of the bonding portion 33, the bonding area in the corner portion 4B is increased, so that the floating of the corner portion 4B of the panel member 4 can be prevented. The bonding portion 33 can be e.g. an adhesive bonding agent or a double-sided adhesive member having elasticity. Incidentally, it is not absolutely needed for the bonding portion 33 to be in contact with the first substrate 21 and the second substrate 22.

The bonding portion 33 and the first and second substrate 21, 22 can be partially spaced from each other.

Figure 20:
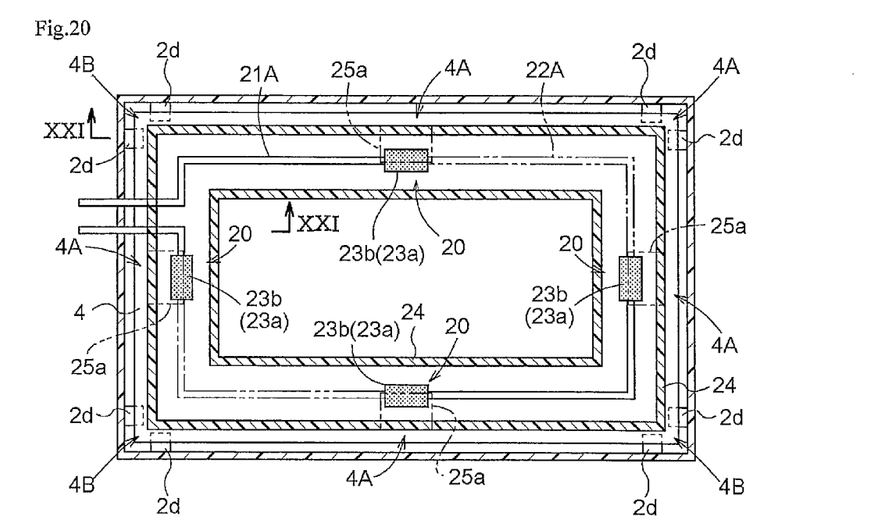
FIG. 20 is a plane view showing layout of a floating prevention mechanism according to a further embodiment.
Figure 21:
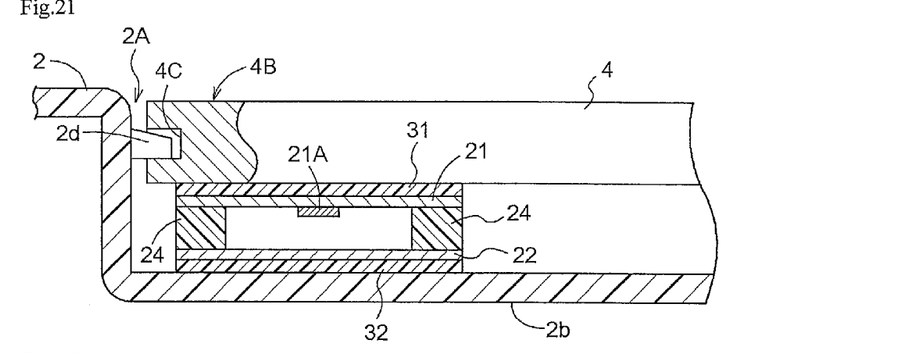
FIG. 21 is a section along XXI-XXI in FIG. 20.

Further, as the floating prevention mechanism, as shown in FIG. 20 and FIG. 21, a concave portion 4C may be provided in a lateral face of the corner portion 4B of the panel member 4 and a convex portion 2d engageable with the concave portion 4C may be provided in the housing body 2. With this arrangement, as the convex portion 2d prevents floating of the corner portion 4B of the panel member 4, reduction in the detection accuracy of the pressure detection unit 20 due to the floating phenomenon can be prevented. Incidentally, the convex portion 2d can be replaced by a concave portion and the concave portion 4C can be replaced by a convex portion.

(3) In the pressure detection unit 20 relating to the present invention, an initial load may be applied in advance to the pressure sensitive layers 23. The connecting portion 24 is comprised of a non-elastic spacer (including the bonding layers to the substrates 21, 22, this can be an adhesive bonding agent alone) whose thickness is smaller than the thickness of the pressure sensitive portion (electrodes, electrically conductive layers, and a pressure sensitive layer). With this, in case deformation of the first substrate 21 or the second substrate 22 is allowed, the first substrate 21 or the second substrate 22 applies a preset pressure as an initial load to the pressure detection unit 20. The connecting portion 24 can be an adhesive bonding agent or double-sided bonding member having elasticity or various kinds of elastic members such as rubber, a tension coil spring, a plate spring in a condition for exerting a tensile force.

In case it is not possible to render the thickness of the connecting portion 24 smaller than the thickness of the pressure sensitive portion, due to the material forming this connecting portion 24, conversely, the thickness of the pressure sensitive portion may be increased to be greater than the thickness of the connecting portion 24, thereby to apply an initial load to the pressure sensitive layers 23. Incidentally, for increasing the thickness of the pressure sensitive portion, this may be realized for instance by printing or applying the electrode 21A, 22A, the electrically conductive layer 22A, 22B or the pressure sensitive layer 23 in a thickness greater than the normal thickness or recoating the same.

With the above arrangements of the connecting portion 24 of the pressure detection unit 20, under the condition when the pressure detection unit 20 is disposed between the panel member 4 and the support portion 2b of the information input device 1, a force is applied to the connecting portion 24 which force tends to retain the original thickness. And, this force acts in the direction for bringing the first substrate 21 and the second substrate 22 closer to each other. That is, by decreasing the distance between the first substrate 21 and the second substrate 22, thereby to reduce the thickness of the pressure sensitive layer 23 under the non-pressed state thereof, a preset pressure as an initial load is applied to the pressure sensitive layer 23.

Figure 22:
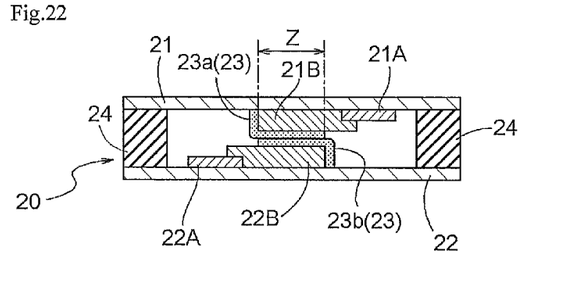
FIG. 22 is an enlarged section showing the vicinity of a pressure detection unit according to a further embodiment.

(4) In the pressure detection unit 20, as shown in FIG. 22, the first electrically conductive layer 21B may be coated with the upper pressure sensitive ink layer 23a and the second electrically conductive layer 22B may be coated with the lower pressure sensitive ink layer 23b, and the first electrode 21A and the second electrode 22A are provided at positions not overlapped with the pressure sensitive area Z.

Figure 23:
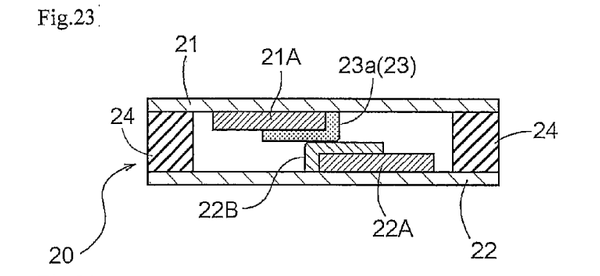
FIG. 23 is an enlarged section showing the vicinity of a pressure detection unit according to a further embodiment.

(5) The pressure detection unit 20 may be configured such that either one of the first electrode 21A and the second electrode 22A (the second electrode 22A in the case of the illustration in FIG. 23) is coated with an electrically conductive layer (the second electrically conductive layer 22B in the case of the illustration in FIG. 23) and the other one of the first electrode 21A and the second electrode 22A (the first electrode 21A in the case of the illustration in FIG. 23) is coated directly with the pressure sensitive layer 23.

(6) In the foregoing embodiments, in the pressure detection units 20 of some of the embodiments alone, the bump 25a overlapped with the pressure sensitive area Z was provided. However, in the pressure detection units 20 of the other embodiments too, the pump 25a may be provided to be overlapped with the pressure sensitive area Z.

Figure 24:
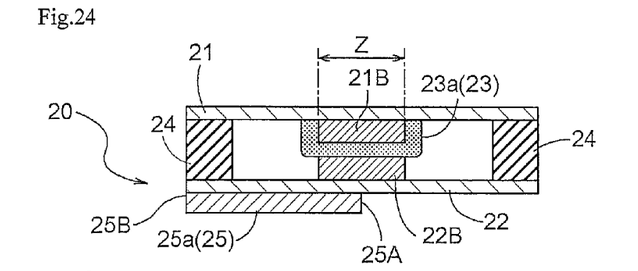
FIG. 24 is an enlarged section showing the vicinity of a pressure detection unit according to a further embodiment.

(7) As shown in FIG. 24, the load transmission member 25 provided in the pressure detection unit 20 may be disposed such that one edge 25A thereof is overlapped with the pressure sensitive area Z and the other edge 25B thereof is not overlapped with the pressure sensitive area Z. The other edge 25B may be disposed on the counter-center side of the panel member 4 relative to the pressure sensitive area Z or conversely this may be on the center side of the panel member 4 relative to the pressure sensitive area Z. In case the bump 25a is formed of an adhesive material, as shown in FIG. 24, by disposing the area from the edge of the first substrate 21 to the edge 25B of the load transmission member 25 on the outermost side of the panel member 4, it is possible to prevent intrusion of foreign substance or water from the outer peripheral side of the panel member 4. Hence, the reliability and durability of the device can be improved. Further, since unnecessary edge portions of the pressure detection unit 20 and the load transmission member 25 can be eliminated, the pressure detection unit 20 can be manufactured easily.

(8) The connecting portion 24 of the pressure detection unit 20 may be provided only on one side of either the counter-center side or the center side of the panel member 4. In particular, if the connecting portion 24 is disposed on the counter-center side (outer side) of the panel member 4, it is possible to prevent intrusion of foreign substance or water through the gap between the panel member 4 and the device main body. Hence, there is no possibility of foreign substance getting stuck between the panel member 4 and the support portion 2b. Further, the chance of damage to the first electrode 21A, the second electrode 22A or the pressure sensitive layer 23 can be reduced. So that the durability of the device will be improved significantly.

INDUSTRIAL APPLICABILITY

The pressure detection unit and the information input device relating to the present invention may be effectively used in various electronic devices or instruments such as a mobile telephone, a smart phone, a PDA, a car navigation device, a digital camera, a digital video camera, a game machine, a tablet, etc., and can be utilized for realization of multiple functions and improvement of the operability of the electronic device or instrument.

The invention claimed is:

1. A pressure detection unit disposed in a peripheral portion of a panel member of an information input device for detecting a press operation to the panel member, the pressure detection unit comprising:
   a first substrate;
   a second substrate disposed to face the first substrate;
   a pressure sensitive layer disposed between the first substrate and the second substrate; and
   a first electrode provided on the first substrate and a second electrode provided on the second substrate for detecting resistance change via the pressure sensitive layer, respectively;

wherein the first electrode and the second electrode are provided at positions not facing each other along normal lines of the first substrate and the second substrate; and the first electrode, the second electrode and the pressure sensitive layer together form a series circuit in the form of a loop.

2. A pressure detection unit disposed in a peripheral portion of a panel member of an information input device for detecting a press operation to the panel member, the pressure detection unit comprising:

a first substrate;

a second substrate disposed to face the first substrate;

a pressure sensitive layer disposed between the first substrate and the second substrate; and a first electrode and a second electrode provided in one of the first substrate and the second substrate for detecting resistance change via the pressure sensitive layer, the first electrode and the second electrode being provided on the face of the one substrate which face faces the pressure sensitive layer;

wherein the first electrode, the second electrode and the pressure sensitive layer together form a series circuit in the form of a loop.

3. The pressure detection unit according to claim 1, wherein the first electrode, the second electrode and the pressure sensitive layer are electrically connected to each other; and a position in the pressure sensitive layer not overlapped with at least one of the first electrode and the second electrode is configured to allow pressing.

4. The pressure detection unit according to claim 1, wherein the first electrode, the second electrode and the pressure sensitive layer are electrically connected to each other; and a position in the pressure sensitive layer overlapped with neither the first electrode nor the second electrode is configured to allow pressing.

5. The pressure detection unit according to claim 1, wherein at least one of the first electrode and the second electrode is coated with an electrically conductive layer.

6. The pressure detection unit according to claim 1, further comprising:

a first electrically conductive layer coating the first electrode; and a second electrically conductive layer coating the second electrode;

wherein the first electrically conductive layer includes a first extension portion extending laterally relative to the first electrode;

the second electrically conductive layer includes a second extension portion extending laterally relative to the second electrode;

the pressure sensitive layer coats at least one of the first extension portion and the second extension portion; and when the pressure detection unit is pressed, the pressure sensitive layer is compressed only by the first electrically conductive layer relating to the first extension portion and the second electrically conductive layer relating to the second extension portion.

7. The pressure detection unit according to claim 5, wherein the electrically conductive layer is comprised of carbon layers containing carbon particles mixed with binder.

8. The pressure detection unit according to claim 1, further comprising a load transmission member provided on an outer face of at least one of the first substrate and the second substrate for applying a concentrated load to the pressure sensitive layer.

9. An information input device comprising:

a panel member adapted for receiving input instruction by a press operation;

a support portion provided in a device body for supporting the peripheral portion of the panel member; and the pressure detection unit according to claim 1 provided between the panel member and the support portion.

10. The pressure detection unit according to claim 2, wherein the first electrode, the second electrode and the pressure sensitive layer are electrically connected to each other; and a position in the pressure sensitive layer not overlapped with at least one of the first electrode and the second electrode is configured to allow pressing.

11. The pressure detection unit according to claim 2, wherein the first electrode, the second electrode and the pressure sensitive layer are electrically connected to each other; and a position in the pressure sensitive layer overlapped with neither the first electrode nor the second electrode is configured to allow pressing.

12. The pressure detection unit according to claim 2, wherein at least one of the first electrode and the second electrode is coated with an electrically conductive layer.

13. The pressure detection unit according to claim 2, further comprising:

a first electrically conductive layer coating the first electrode; and a second electrically conductive layer coating the second electrode;

wherein the first electrically conductive layer includes a first extension portion extending laterally relative to the first electrode;

the second electrically conductive layer includes a second extension portion extending laterally relative to the second electrode;

the pressure sensitive layer coats at least one of the first extension portion and the second extension portion; and when the pressure detection unit is pressed, the pressure sensitive layer is compressed only by the first electrically conductive layer relating to the first extension portion and the second electrically conductive layer relating to the second extension portion.

14. The pressure detection unit according to claim 6, wherein the electrically conductive layer is comprised of carbon layers containing carbon particles mixed with binder.

15. The pressure detection unit according to claim 1, further comprising a load transmission member provided on an outer face of at least one of the first substrate and the second substrate for applying a concentrated load to the pressure sensitive layer.

* * * * *